Sept. 4, 1928.
W. W. BROWN
1,683,157
CONTROLLER HANDLE
Filed June 23, 1927
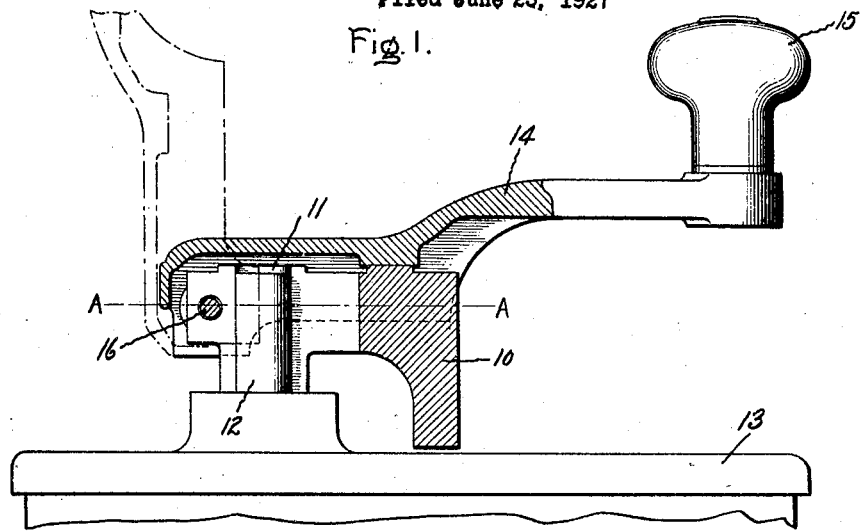
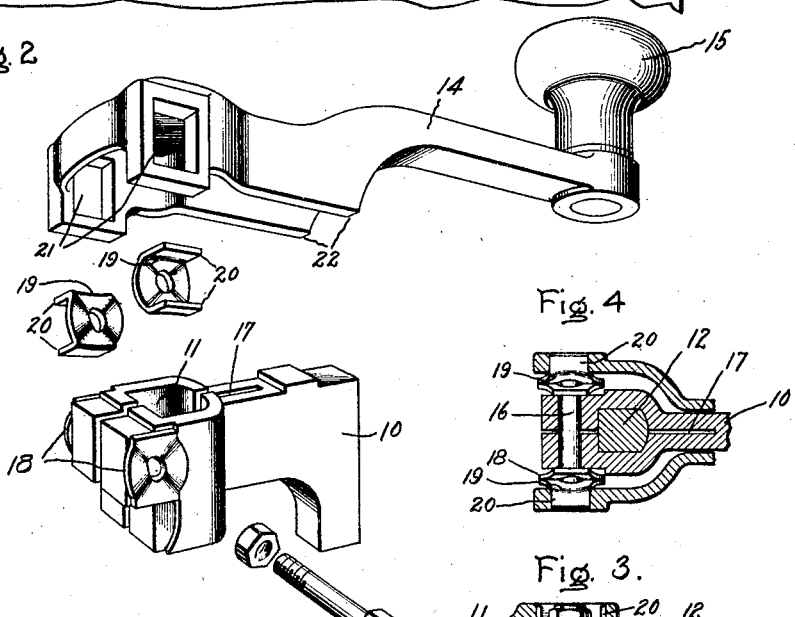
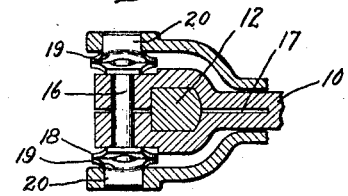
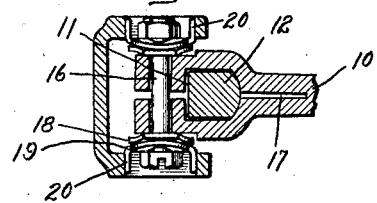
Inventor:
Walter W. Brown,
by *Alexander F. Lunt*
His Attorney.

Patented Sept. 4, 1928.

1,683,157

UNITED STATES PATENT OFFICE.

WALTER W. BROWN, OF ERIE, PENNSYLVANIA, ASSIGNOR TO GENERAL ELECTRIC COMPANY, A CORPORATION OF NEW YORK.

CONTROLLER HANDLE.

Application filed June 23, 1927. Serial No. 200,980.

The invention relates to controller handles and more particularly to removable operating handles for controllers of the type in common use on trolley cars.

The principal object of the invention is to insure that the controller handle is rigidly engaged with the controller shaft operated thereby but may be easily removed at will.

The ordinary controller operating handle is provided with a hub having a broached hole or socket formed therein of a shape adapted to receive the square end of the controller shaft. However, with this arrangement a very close fit between the socket in the hub of the handle and the end of the controller shaft is required to prevent any relative movement therebetween and still permit the controller handle readily to be applied and removed from the controller shaft. In case the controller handle is not rigidly fixed to the end of the controller shaft, any slight lost motion soon is amplified due to the resulting wear and concussion occurring between the end of the controller shaft and the hub of the handle under service conditions. With an appreciable lost motion between the controller handle and the controller shaft the operator is unable to feel accurately the engagement of the controller fingers at the different operating positions of the controller and therefore is unable to operate the controller to its various positions with the accuracy and precision obtained with the controller handle tightly fixed upon the shaft.

The improved controller handle of the present invention is arranged to be clamped securely and rigidly upon the shaft of the controller at all times under operating conditions, and still may be readily released from the controller shaft whenever desired. Briefly this is accomplished in accordance with the preferred form of the invention by providing a slot in the hub of the controller handle intersecting the broached hole or opening which receives the end of the controller shaft. The operating handle proper is pivotally mounted upon the slotted hub so that it may be raised from its normal operating plane of rotation and carries resilient cam shaped members that are arranged to exert a wedging action upon cooperating cam members fixed on the hub in such manner that the slotted sides of the hub are forcibly clamped upon the end of the controller shaft when the operating handle is lowered into the operating position. In this way rigid engagement of the hub with the end of the controller shaft is effected when the operating handle is in its normal operating position while with the operating handle raised, the clamping action of the hub is released thereby readily permitting easy removal of the handle.

The accompanying drawing illustrates the construction of the controller handle embodying the preferred form of the invention outlined above. Fig. 1 is a view showing the general arrangement of the improved controller handle with certain parts broken away in order to more fully reveal the details of construction. Fig. 2 is a perspective exploded view of the several parts of the controller handle, and Figs. 3 and 4 are sectional views of the controller handle along the line AA of Fig. 1 with the operating handle in its lowered and raised positions respectively.

As shown in Fig. 1 the controller handle comprises the hub portion 10 which is provided with a broached hole 11 forming a socket for receiving the partially squared end of the operating shaft 12 of the controller 13 which may be of any usual type and hence is not shown in detail. The operating arm 14 carrying the handle or knob 15 is pivotally mounted upon the hub 10 by means of the bolt 16.

As shown more clearly in the perspective view of Fig. 2, a slot 17 intersecting the socket hole 11 in the hub 10 is provided in order to permit the sides of the hub forming the socket to be clamped securely upon the end of the controller shaft in the manner to be pointed out hereinafter. The opposite sides of the hub 10 are suitably recessed to seat the cam shaped members 18. These cam shaped members 18 preferably are formed of spring steel although they may be formed integral with the hub 10 if desired.

The two complementary cam shaped members 19 which cooperate with the cam members 18 each are provided with the lugs 20 of suitable dimensions to engage with the rectangular holes 21 formed in the channel sides 22 of the arm 14 carrying the operating handle 15. The channel sides 22 of the arm 14 are spaced apart so as to snugly fit over the hub 10 with the handle in its proper operating position as shown in Fig. 1, thereby forming a strong positive driving connection between the hub and the movable handle arm 14.

In assembling the handle, the cam members 19 are placed in the square holes 21 and the hub 10 with the cam members 18 in place inserted between the channels 22. During this operation the operating arm 14 is raised substantially at right angles to the hub 10 so as to permit the cam members 18 and 19 to nest in complementary cooperating relation. The bolt 16 is then passed through the center holes in the cam members 18 and 19 and the corresponding hole in the hub 10 and tightened up sufficiently to produce snug engagement of the cam surfaces of the members 18 and 19. The cam members 19 are made complementary to the cam members 18 so that the double rounded or conical cam surfaces on one of the members nest within the corresponding cam surfaces of the other member when the arm 14 is raised but are moved out of nesting relation to exert a resilient wedging action of the sides of the slotted hub 10 when the arm 14 is lowered into its normal operating position. Thus the cam surfaces on the members 18 may be of convex conical shape while the cooperating cam surfaces on the members 19 are of concave conical shape. The rounded double conical complementary cam members 18 and 19 illustrated in the drawing are particularly adapted for producing the resilient clamping action upon the slotted sides of the hub 10 although it will be understood that other shapes for the cams may be employed if desired.

With the parts of the handle assembled as just described, the broached hole 11 in the hub 10 of the handle may be readily applied to the end of the controller shaft 12 since there is no clamping action exerted on the slotted sides of the hub when the arm 14 is in the raised position. Fig. 3 illustrates in cross section the relative arrangement of the slotted hub, the operating arm and the cam members 18 and 19 when the hub of the handle is applied to the controller shaft. As indicated in the drawing there is ample clearance between the socket hole in the hub and the end of the controller shaft to permit the easy application and removal of the hub when the operating arm 14 is raised.

To firmly clamp the hub upon the controller shaft 12 it is only necessary to swing the operating arm 14 from the raised or vertical position into its normal horizontal operating position, as indicated in Fig. 1. This movement of the operating arm carries the cam members 19 out of nesting relation with the cam members 18. The resulting clamping action produced by the cam members forces the slotted sides of the hub 10 into rigid engagement with the controller shaft 12, as shown in Fig. 4. Thus with the operating arm 14 in its normal horizontal position the controller may be very accurately rotated to its various operative positions with no lost motion whatsoever between the operating handle and the controller shaft. As previously pointed out this greatly facilitates the accuracy and precision of control and prevents wear of either the controller shaft or the handle hub.

To remove the handle from the controller the operating arm 14 is raised to the vertical position as indicated by the dotted lines in Fig. 1 to reestablish the cooperating nesting relation between the cam members 18 and 19. This relieves the clamping action on the slotted sides of the hub 10 and the latter immediately open up to free the hub of the handle from the shaft of the controller. Consequently the controller handle may be readily removed from the controller shaft.

It will be noted that the use of the separate cam members 18 and 19 formed of spring steel insures long life of these parts even under severe service conditions. Moreover, these separate parts may be readily renewed whenever necessary.

While I have shown and described the invention embodied in the preferred form it will be understood that various changes and modifications may be made without departing from the spirit and scope of the invention.

What I claim as new and desire to secure by Letters Patent of the United States is:

The combination with an electric controller having an operating shaft, of an operating handle for the controller shaft including a slotted hub portion having a shaft-receiving socket intersecting the slot therein, an operating handle pivotally mounted upon the slotted hub portion for rotation in the plane substantially parallel to the slot in said hub, a pair of double conical cam members mounted in the hub on opposite sides of the slot therein, a pair of complementary conical cam members mounted in the operating handle in such cooperating relation with the cam members of the hub as to increase the width of the slot in the hub when the operating handle is raised to a position substantially at right angles to the hub and to decrease the width of the slot in the hub when the operating handle is lowered into alignment with the hub.

In witness whereof, I have hereunto set my hand this 21 day of June, 1927.

WALTER W. BROWN.